(12) United States Patent
Childress et al.

(10) Patent No.: US 8,510,393 B2
(45) Date of Patent: Aug. 13, 2013

(54) E-MAIL AWARENESS ENHANCEMENT

(75) Inventors: Rhonda L. Childress, Austin, TX (US); Pamela A. Nesbitt, Somers, NY (US); Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 12/643,485

(22) Filed: Dec. 21, 2009

(65) Prior Publication Data

US 2011/0153753 A1 Jun. 23, 2011

(51) Int. Cl.
G06F 15/16 (2006.01)

(52) U.S. Cl.
USPC .......................................... 709/206

(58) Field of Classification Search
USPC ................. 709/205–207
See application file for complete search history.

(56) References Cited

U.S. PATENT DOCUMENTS

| | | | |
|---|---|---|---|
| 6,088,720 A * | 7/2000 | Berkowitz et al. | 709/206 |
| 6,934,738 B1 * | 8/2005 | Furusawa et al. | 709/206 |
| 7,305,437 B2 | 12/2007 | Horvitz et al. | |
| 2002/0087646 A1 | 7/2002 | Hickey et al. | |
| 2003/0163538 A1 | 8/2003 | Yeh et al. | |
| 2004/0254998 A1 * | 12/2004 | Horvitz | 709/206 |
| 2005/0021485 A1 | 1/2005 | Nodelman et al. | |
| 2007/0244974 A1 * | 10/2007 | Chasin | 709/206 |
| 2008/0016575 A1 * | 1/2008 | Vincent et al. | 726/26 |
| 2008/0074240 A1 | 3/2008 | Jones et al. | |
| 2008/0104175 A1 * | 5/2008 | Keohane et al. | 709/206 |
| 2009/0037359 A1 * | 2/2009 | Callanan et al. | 706/47 |
| 2009/0158441 A1 * | 6/2009 | Mohler et al. | 726/27 |
| 2010/0169264 A1 * | 7/2010 | O'Sullivan et al. | 706/52 |
| 2010/0287249 A1 * | 11/2010 | Yigang et al. | 709/206 |
| 2011/0161426 A1 * | 6/2011 | DeLuca et al. | 709/206 |

OTHER PUBLICATIONS

Toney et al., "Social weight: designing to minimise the social consequences arising from technology use by the mobile professional", Springer-Verlag London Limited 2003, Pers Ubiqui Comput (2003) 7: 309-320.
Cataldo et al., "Identification of Coordination Requirements: Implications for the Design of Collaboration and Awareness Tools", ACM Digital Library, pp. 353-362 http://www.casos.cs.cmu.edu/awards/papers/cscw06_publish_final.pdf.

* cited by examiner

*Primary Examiner* — Shirley Zhang
(74) *Attorney, Agent, or Firm* — Yee & Associates, P.C.; Jeffrey S. LaBaw

(57) ABSTRACT

A method for preserving e-mail messages. It is determined, by a processor, whether an event has occurred with respect to an e-mail message, wherein an occurrence of the event results in a consequence activity with respect to the e-mail message. Responsive to determining that the event has occurred, it is determined, by the processor, whether criteria is satisfied, wherein the criteria relates to a status of an e-mail user. Responsive to determining that the criteria is satisfied, the consequence activity is prevented notwithstanding that the event has occurred.

24 Claims, 7 Drawing Sheets

E-MAIL AWARENESS ENHANCEMENT

BACKGROUND

1. Field

The disclosure relates generally to an electronic mail (e-mail) messaging system, and more specifically, to a method, apparatus and computer program product for preserving e-mail messages.

2. Description of the Related Art

The Internet is a global network of computers and networks joined together by gateways that handle data transfer and the conversion of messages from a protocol of a sending network to a protocol used by a receiving network. On the Internet, any computer may communicate with any other computer. Information between computers travels over the Internet through a variety of languages also referred to as protocols. The set of protocols used on the Internet is called the Transmission Control Protocol/Internet Protocol (TCP/IP).

The Internet has revolutionized communications and commerce as well as being a source of information and entertainment. For many users, e-mail is a widely used format to communicate over the Internet. It is commonplace for users to send e-mail messages to other users through the Internet.

The use of e-mail messages is commonplace for both personal and business use. E-mail messages are used by individuals to keep in touch with and communicate with other users. Additionally, e-mail messages provide a medium to collaborate and exchange documents.

Expiration of e-mail messages and shutdown of e-mail services due to an overfull mailbox have become normal and necessary parts of e-mail messaging systems in order to prevent server disk space overload. The toll on productivity as a result of these actions may be enormous. The loss of important documents as a result of inattention by an e-mail user is a potential hazard to company productivity and audit trails.

In addition, an absence from work due to a vacation or for another reason, or a lack of access to an e-mail account for any reason may cause an e-mail user to fail in the maintenance of important documents and in limiting e-mail repository size. The result may be the permanent removal of critical documents as a result of their having expired and/or the inability to receive important documents as a result of a locking of an e-mail account due to a lack of disk storage space.

SUMMARY

According to one illustrative embodiment, a method is provided for preserving e-mail messages. It is determined, by a processor, whether an event has occurred with respect to an e-mail message, wherein an occurrence of the event results in a consequence activity with respect to the e-mail message. Responsive to determining that the event has occurred, it is determined, by the processor, whether criteria is satisfied, wherein the criteria relates to a status of an e-mail user. Responsive to determining that the criteria is satisfied, the consequence activity is prevented notwithstanding that the event has occurred.

DETAILED DESCRIPTION

Figure 1:
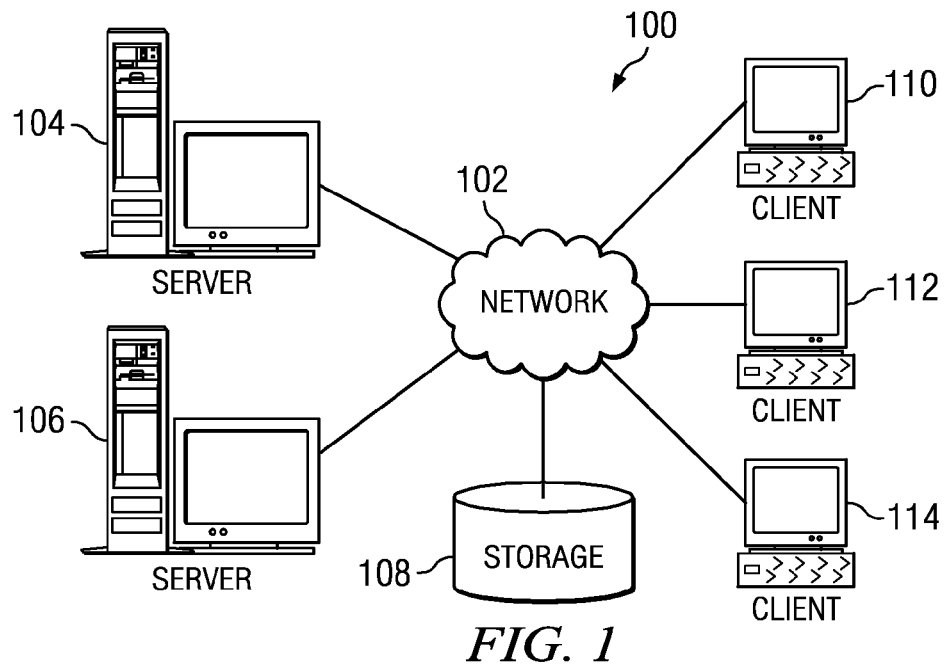
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
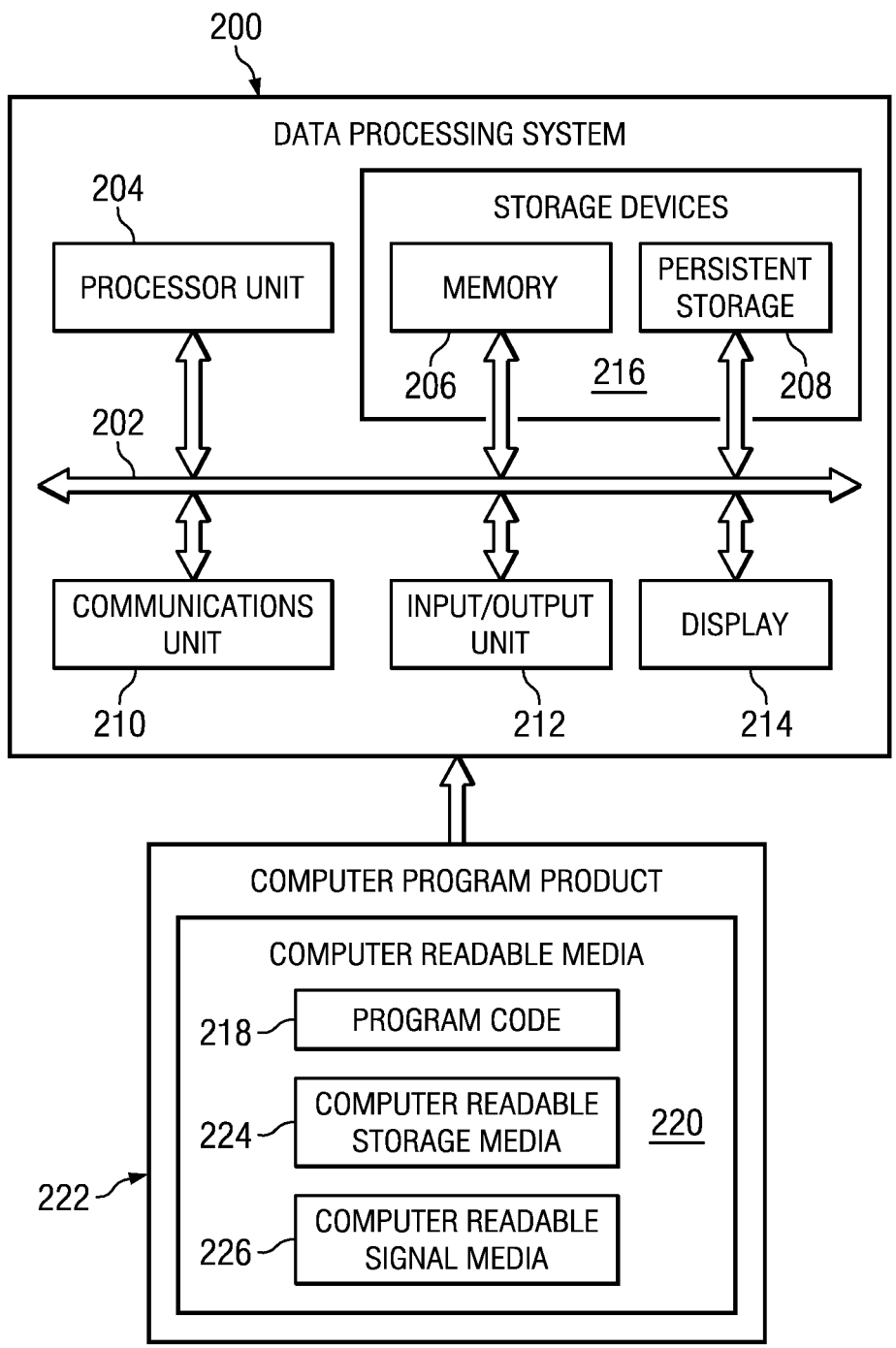
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
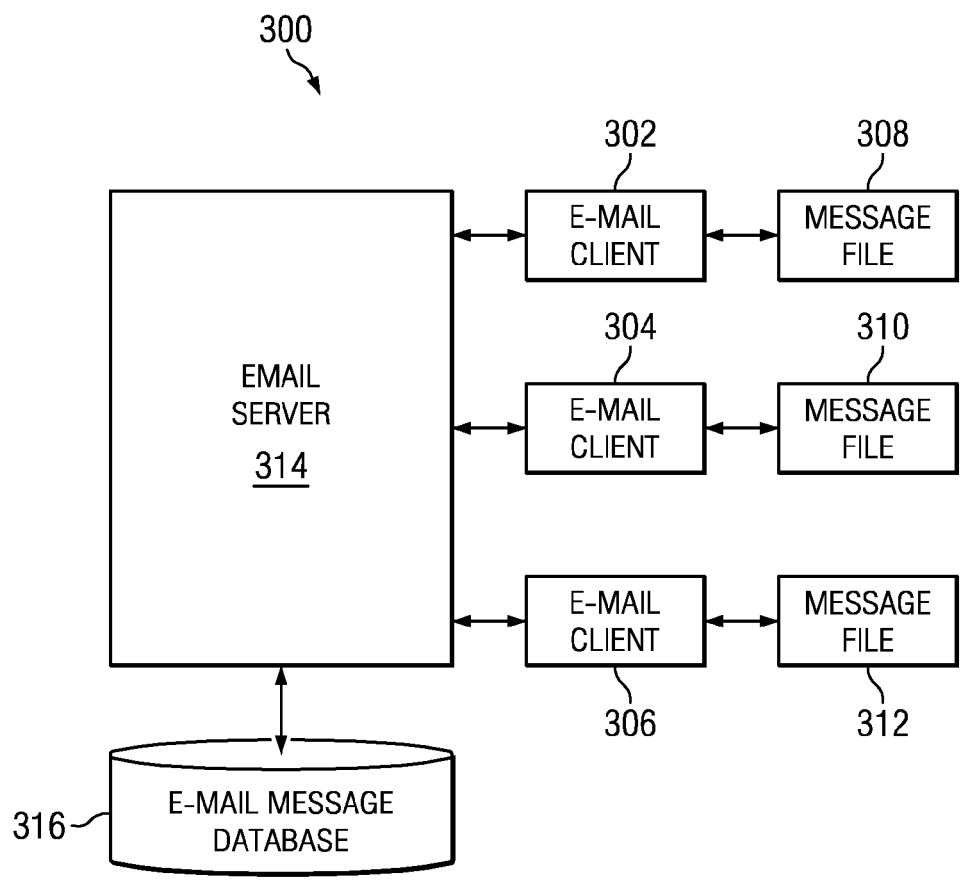
FIG. 3 is a block diagram of an e-mail messaging system in accordance with an illustrative embodiment.

Turning now to FIG. 3, a diagram illustrating an e-mail messaging system is depicted in accordance with an illustrative embodiment. In this example, e-mail messaging system 300 includes e-mail client 302, e-mail client 304, and e-mail client 306, which are programs or applications located at different client data processing systems, such as client 110, client 112, and client 114 in FIG. 1. Message file 308, message file 310, and message file 312 are associated with these e-mail clients. These message files store e-mail messages received by the clients and may be organized into various mailboxes. Examples of various mailboxes include, for example, an in folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent which stores and forwards the mail. Other protocols, such as post office protocol 3 (POP3), also may be employed.

These e-mail programs are used to send e-mails back and forth to different users through e-mail server 314. Messages sent to other e-mail clients are stored in e-mail message database 316. When an e-mail client connects to e-mail server 314, any messages for that particular client are then sent to the client. E-mail clients 302, 304, and 306 may be implemented using presently available e-mail clients.

Illustrative embodiments recognize that an e-mail messaging system may provide for an e-mail message to expire after a predetermined period of time, or for a user's e-mail service to be shut down completely due to an overfull mailbox or due to user inactivity for an excessive period of time. Typically, an e-mail messaging system that provides for message expiration will send one or more e-mail expiration warning notifications to the user warning of an impending e-mail expiration, and these notifications may accelerate the filling up of a user's mailbox.

A lack of access to e-mail due to an absence from work or for other reasons may cause a user to fail to maintain important documents or to control repository size, and the result can be the permanent removal of important documents and/or the locking of the user's e-mail account, thus potentially preventing important documents from even being received.

Therefore, the different illustrative embodiments provide a method, apparatus and computer program product for temporarily stopping an e-mail messaging system from performing an e-mail message expiration function and/or a mailbox locking function. According to an illustrative embodiment, an "out-of office" or "away" status may be designated by a user when, for example, the user will be out of his/her office for a period of time or will otherwise be unable to attend to the chores of maintaining a healthy repository size and ensuring the safe storage of important e-mail documents. During this temporary period of time, e-mail expiration will be prevented and mailbox locking due to size considerations will be put on hold until the user returns. According to illustrative embodiments, extra temporary storage may be provided to accommodate the saved messages, and some buffer of time may also be provided to allow the user sufficient time to tend to his/her e-mail after the temporary period of time expires.

According to a further illustrative embodiment, e-mail messages warning of an impending locking of an account or of an impending expiration of a message may also be suspended during the temporary period to reduce the number of e-mail messages sent to the user during his/her absence.

Figure 4:
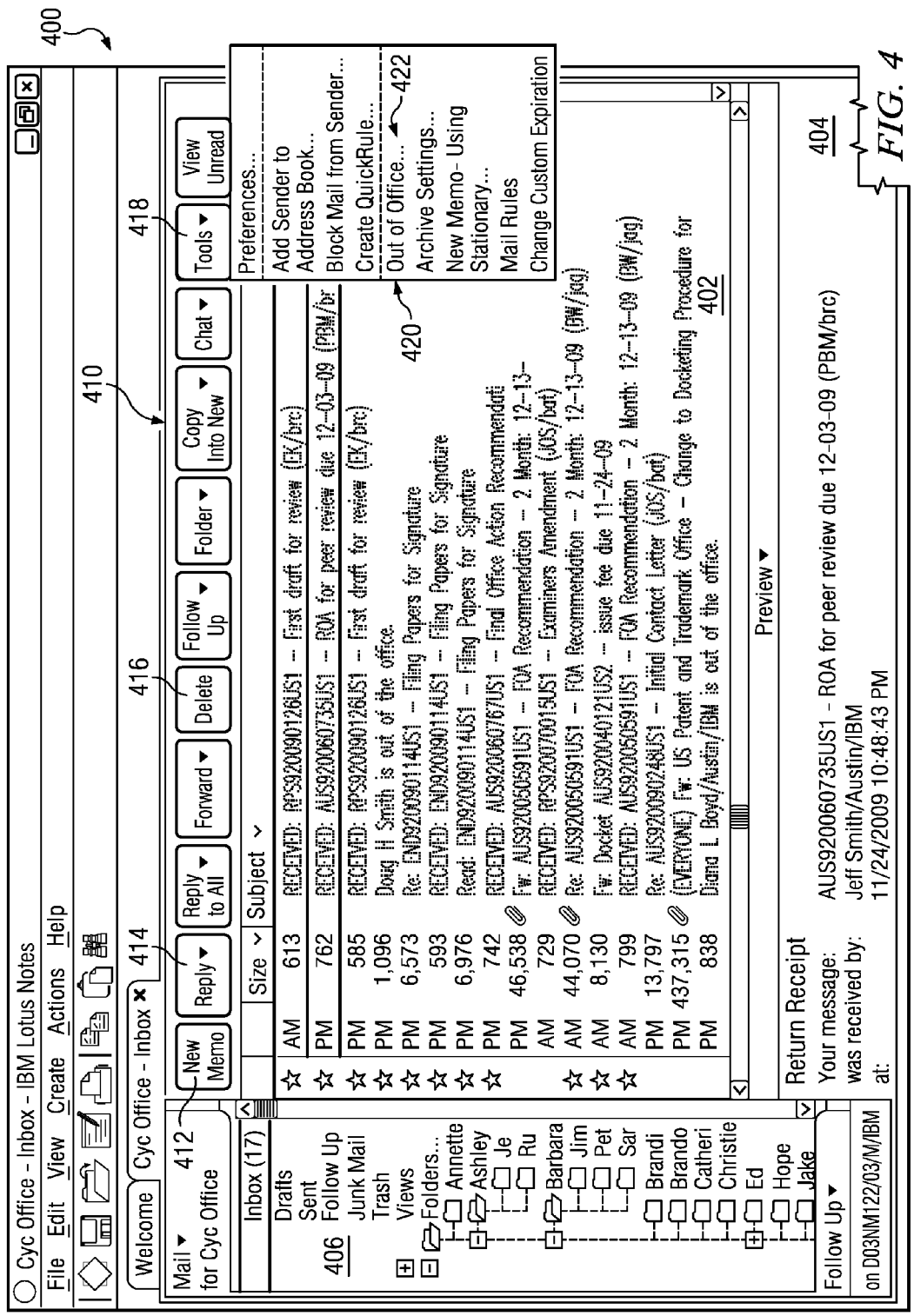
FIG. 4 is an illustration of a display of an e-mail messaging system in accordance with an illustrative embodiment.

With reference now to FIG. 4, an illustration of a display of an e-mail messaging system is depicted in accordance with an illustrative embodiment. The display is generally designated by reference number 400, and may be a display presented on the display screen of an e-mail user's computer, for example, on a display screen of one of e-mail clients 302, 304 or 306 in FIG. 3. As shown in FIG. 4, display 400 includes a first screen portion 402 that contains a listing of received e-mail messages, a second screen portion 404 that displays a selected one of the e-mail messages listed in first screen portion 402, and a third display portion 406 that lists categories of e-mail messages (mailboxes) that may be selected for listing in first screen portion 402. In FIG. 4, first screen portion 402 contains a listing of e-mail messages in a user's "Inbox." It should be understood, however, that display 400 is intended to be exemplary only as different e-mail messaging systems may provide different displays, and individual users may modify the display in numerous ways depending on preferences.

Display 400 may also include a plurality of action buttons, generally designated by reference number 410, which may be selected by a user, for example, by clicking on with a mouse, to perform various actions. As shown in FIG. 4, the action buttons may include, for example, "new memo" action button 412, "reply" action button 414, "delete" action button 416 and "tools" action button 418. Some of these action buttons may, when selected, result in a drop down menu being opened which lists additional actions which may be selected by the user. For example, as also shown in FIG. 4, selection of "tools" action button 418 opens a drop down menu 420.

One of the options listed on drop down menu 420 includes an "out-of-office" option 422. "Out-of-office" option 422 may be selected by a user when the user will be on vacation or otherwise unavailable to access his or her e-mail for a period of time.

Figure 5:
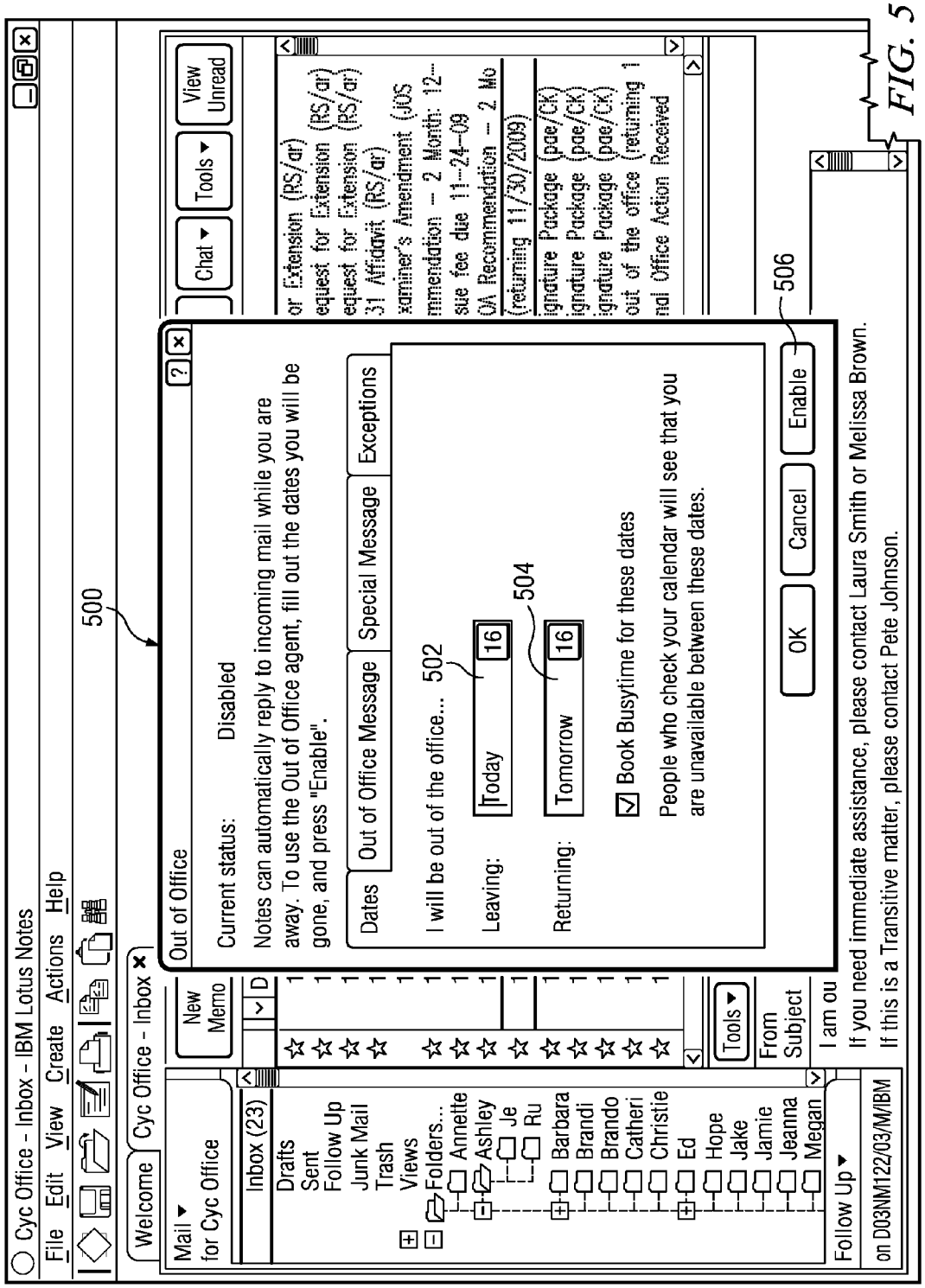
FIG. 5 is an illustration of an "out-of-office" dialog box in accordance with an illustrative embodiment.

When the user clicks on the "out-of office" selection, a dialog box may be opened as illustrated in FIG. 5. In particular, FIG. 5 is an illustration of an "out-of-office" dialog box in accordance with an illustrative embodiment. The dialog box is generally designated by reference number 500, includes a box 502 for a user to indicate the date that he/she will be leaving, and a second box 504 for the user indicate the date he/she will return to the office. By filling in blocks 502 and 504 and then pressing enable button 506, if an e-mail message is received during the "out-of-office" period specified by filling in boxes 502 and 504, a reply will automatically be sent to the sender of the e-mail message advising the sender that the user is away from the office.

In accordance with an illustrative embodiment, in addition to notifying a sender of an e-mail message that the user is in an "out-of office" or "away" status, pressing enable button 506 also serves as an indication to the e-mail messaging system that the user will, during the period identified by boxes 502 and 504, be unable to attend to the chore of maintaining a healthy repository size for e-mail messages and for safely storing important e-mail messages before the e-mail messages reach their expiration date. In particular, in accordance with an illustrative embodiment, when the "out-of-office" message is enabled by pressing enable button 506, the user's e-mail messaging system will make note of this fact and cease all e-mail expiration functions and all mailbox locking functions for the period of time that the user will be away. In other words, in accordance with an illustrative embodiment, an indication of an absence of a user from e-mail proximity due to being away from work or for another reason causes changes in the behavior of the e-mail messaging system including no warnings of or deletion of e-mail messages for maintenance, no warnings of an impending locking of a user's e-mail account, and no locking of the e-mail account for at least the time period indicated in the indication. As a result, a user can be assured that no important e-mails will be lost during his/her absence, either by having expired or by not being accepted as a result of the user's account being locked.

In accordance with a further illustrative embodiment, after the user has returned from his or her absence, and the designated time period has expired, the e-mail messaging system may provide a buffer period of time, for example, two or three days, to provide sufficient time for the user to attend to all of the e-mail messages that may have been received in his/her absence. Some additional temporary storage may also be provided by the e-mail messaging system to hold the received e-mails during the period of absence and during the buffer time period. After the buffer period of time has expired, the e-mail messaging system may resume normal behavior including warning of expiring e-mail messages and deleting e-mail messages upon their expiration, warning of impending locking of a user's e-mail account, and locking of the account when the user's mailbox becomes full. Thus, after the buffer period of time has expired, those e-mail messages that were scheduled to expire during the user's absence, will now be allowed to expire, and the user's mailbox capacity will be adjusted as necessary by deleting additional e-mail messages that were saved during the user's absence.

In the illustrative embodiment described with reference to FIGS. 4 and 5, the absence of a user from e-mail proximity was indicated by the user specifying an "out-of-office" period of time. In accordance with illustrative embodiments, the absence of a user from e-mail proximity can be indicated in other ways, for example, by an indication on a calendar of an e-mail messaging system.

Figure 6:
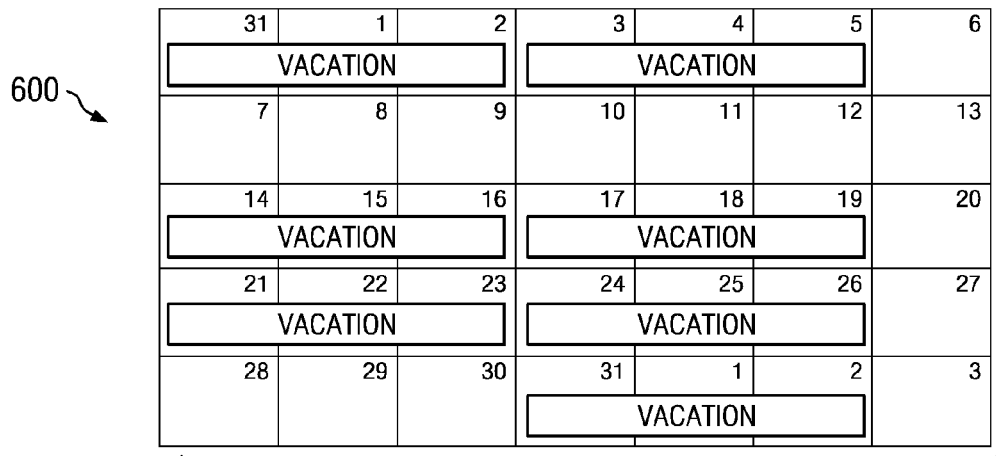
FIG. 6 is an illustration of a display depicting a calendar of an e-mail messaging system in accordance with an illustrative embodiment.

FIG. 6 is an illustration of a display depicting a calendar of an e-mail messaging system in accordance with an illustrative embodiment. The calendar is generally designated by reference number 600, and as shown, contains an indication that the user will be on vacation from the 30$^{th}$ of a month to at least the 6$^{th}$ of the following month. Such an indication can also be used to cause changes in the behavior of the e-mail messaging system such that no warnings of or deletions of e-mail messages for maintenance, no warnings of an impending locking of a user's e-mail account, and no locking of the e-mail account will take place for at least the time period indicated on the calendar.

In accordance with further illustrative embodiments, the absence of a user from e-mail proximity can be indicated in yet other ways. For example, an indication that a user has no Internet access or that there has been no activity with respect to a user's mailbox for a predetermined number of days can be used to indicate a user's inability to access e-mail messages and cause the e-mail messaging system to change its behavior.

Figure 7:
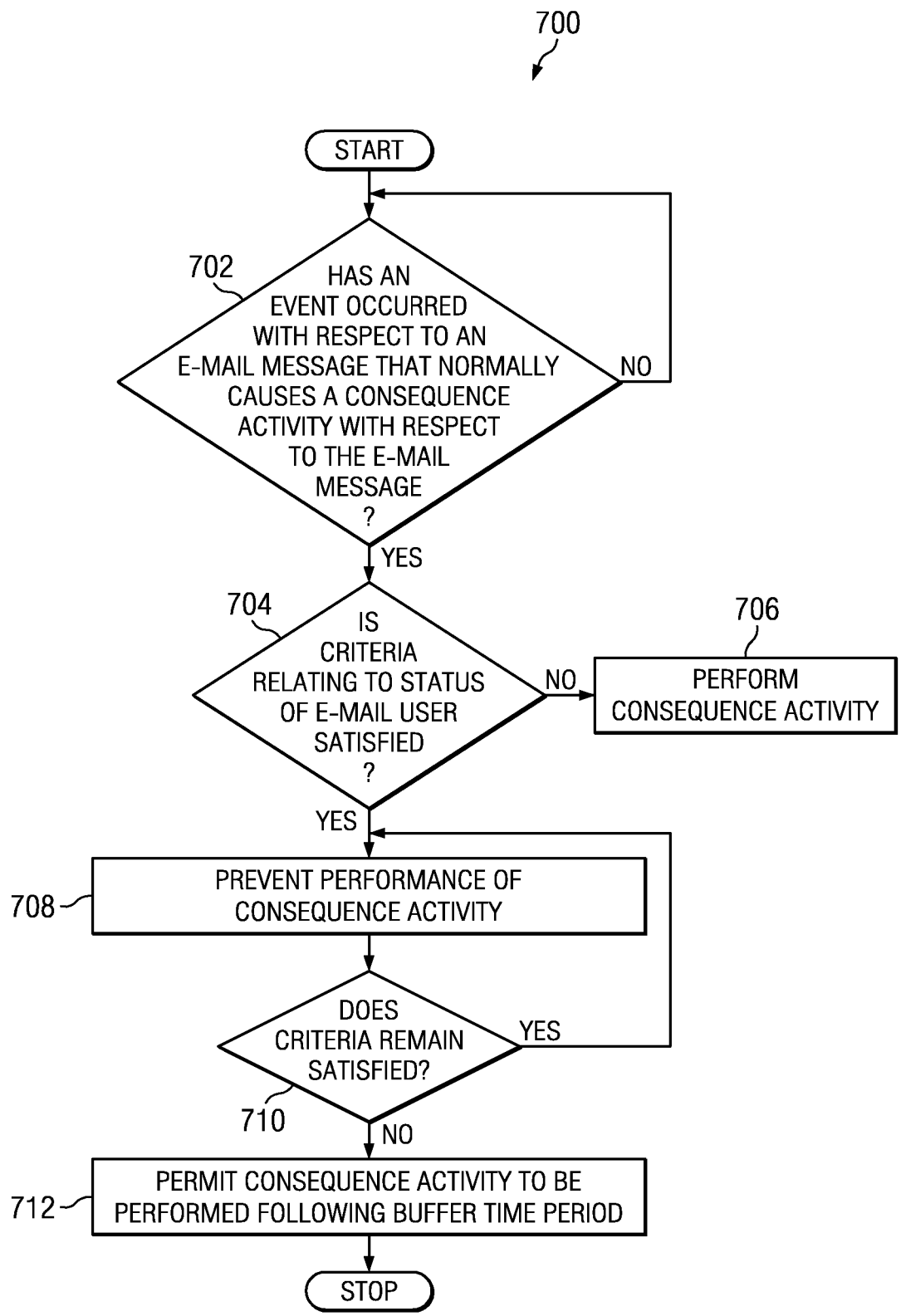
FIG. 7 is a flowchart that illustrates a method for preserving e-mail messages in accordance with an illustrative embodiment.

FIG. 7 is a flowchart that illustrates a method for preserving e-mail messages in accordance with an illustrative embodiment. The method is generally designated by reference number 700, and begins by determining whether an event has occurred with respect to an e-mail message that normally causes a consequence activity with respect to the e-mail message (Step 702). For example, the event may be the receipt of an e-mail message by an e-mail user whose mailbox storage threshold has been reached, or the event may be that a previously received e-mail message is approaching or has reached its expiration date. If it is determined that such an event has not occurred (No output of Step 702), the method returns to Step 702. If, however, it is determined that an event has occurred with respect to an e-mail message that normally causes a consequence activity with respect to the e-mail message (Yes output of Step 702), it is determined whether criteria relating to a status of an e-mail user is satisfied (Step 704). For example, the criteria may be one or more of the e-mail user having set an away message such as an "out-of-office" message, a user's calendar indicating that the subscriber is on vacation or otherwise unavailable to access his/her e-mail messages, that there is no Internet access and that that there has been no activity with respect to an e-mail user's mailbox for a predetermined period of time, for example, a predetermined number of days.

Responsive to determining that criteria relating to the status of the e-mail user is not satisfied (No output of Step 704), the consequence activity is performed (Step 706). For example, if the event is the receipt of an e-mail message by an e-mail user whose mailbox storage threshold has been reached, the consequence activity may be the deletion of the e-mail message. On the other hand, if the event is that a previously received e-mail is approaching or has reached its expiration date, the consequence activity may be the sending of an e-mail message expiration warning notification to the user, or deleting the e-mail message when the expiration date has been reached.

Responsive to determining that criteria relating to the status of the e-mail user is satisfied (Yes output of Step 704), performance of the consequence activity is prevented (Step 708). For example, an e-mail message received after the e-mail user's mailbox is full will not be deleted, or an e-mail message that has reached its expiration date will not be deleted.

It is continued to be monitored whether criteria relating to the status of the e-mail user remains satisfied (Step 710). So long as the criteria remains satisfied (Yes output of Step 710), performance of the consequence activity is prevented. If it is determined, however, that the criteria relating to the status of the e-mail user is no longer satisfied (No output of Step 710), performance of the consequence activity is again permitted (Step 712). For example, e-mail messages that have reached their expiration date will now be deleted and e-mail messages that caused the user's mailbox to exceed a threshold storage will also be deleted. Performance of the consequence activity may be permitted to resume after a predetermined buffer time period, for example, one to three days, to provide the e-mail user with a reasonable time to review and act on all the e-mail messages that may have been received in his/her absence.

Figure 8:
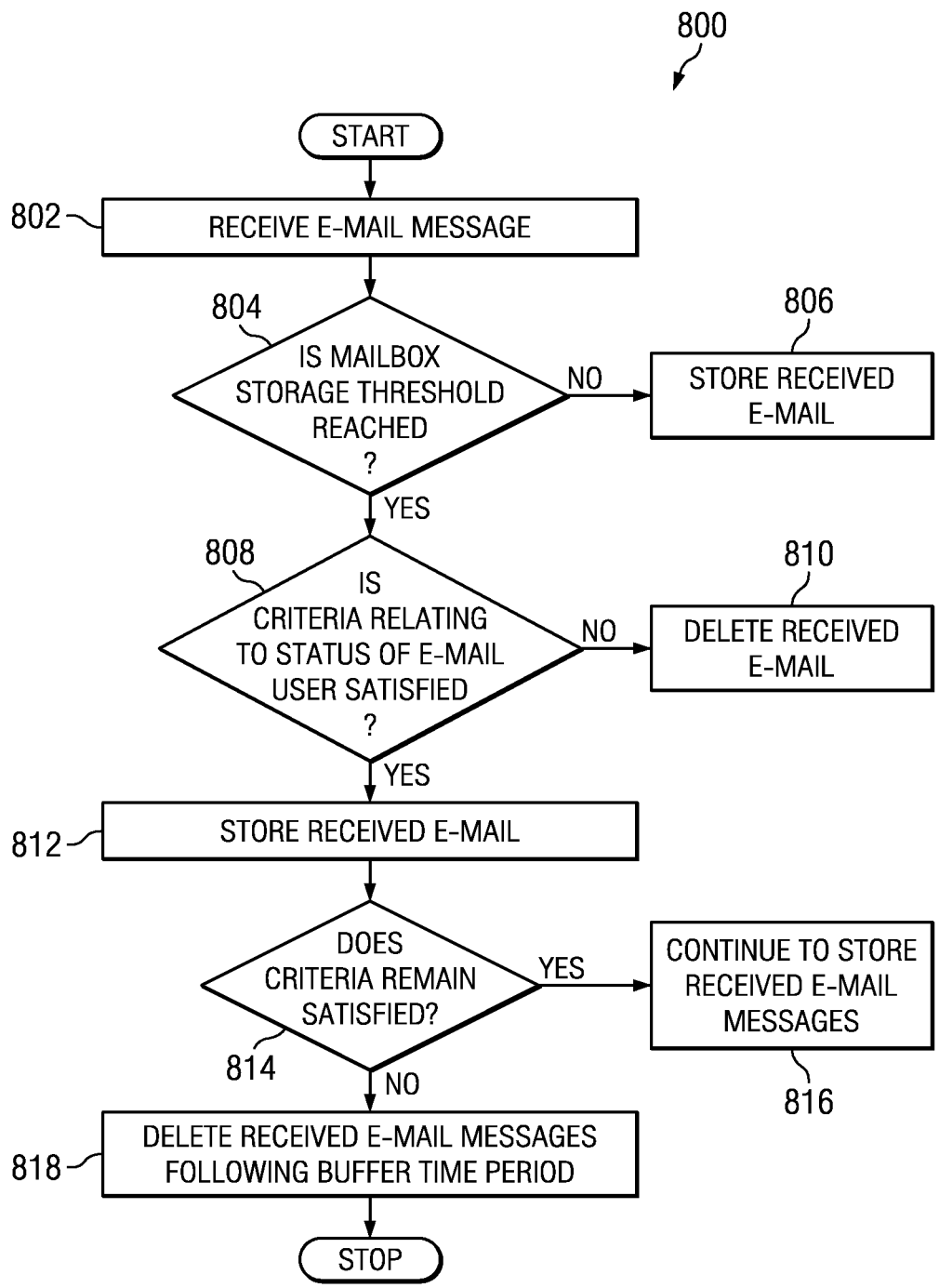
FIG. 8 is a flowchart that illustrates method for preserving e-mail messages received after an e-mail user's mailbox has reached a storage threshold in accordance with an illustrative embodiment.

FIG. 8 is a flowchart that illustrates a method for preserving e-mail messages received after an e-mail user's mailbox has reached a storage threshold in accordance with an illustrative embodiment. The method is generally designated by reference number 800, and may be implemented by method 700 illustrated in FIG. 7. An e-mail message addressed to an e-mail user is received (Step 802). It is determined whether the user's mailbox storage threshold has been reached (Step 804). If it is determined that the e-mail user's mailbox storage threshold has not been reached (No output of Step 804), the received e-mail message is stored (Step 806). If it is determined that the e-mail user's mailbox storage threshold has been reached (Yes output of Step 804), it is determined whether criteria relating to a status of the e-mail user is satisfied (Step 808).

If it is determined that the criteria relating to the status of the e-mail user is not satisfied (No output of Step 808), the received e-mail message is deleted and is not stored in the user's mailbox, and is thus lost to the user (Step 810). If, on the other hand, it is determined that the criteria relating to the status of the e-mail user is satisfied (Yes output of Step 808), the received e-mail message is stored, and will thus be accessible by the user notwithstanding that the user's mailbox storage threshold has been reached (Step 812).

It is then determined whether the criteria relating to the status of the e-mail user remains satisfied (Step 814). If it is determined that the criteria relating to the status of the e-mail user remains satisfied (Yes output of Step 814), the e-mail messaging system continues to store received e-mail messages (Step 816). If it is determined, however, that the criteria relating to the status of the e-mail user is no longer satisfied (No output of Step 814), e-mail messages will be deleted from the mailbox to return the mailbox to within threshold requirements and newly received e-mail messages will not be stored (Step 818). In accordance with an illustrative embodiment, the deletion may take place after a predetermined buffer time period, for example, one to three days, to provide the user with a reasonable time to review and act on the e-mails before they are deleted.

Figure 9:
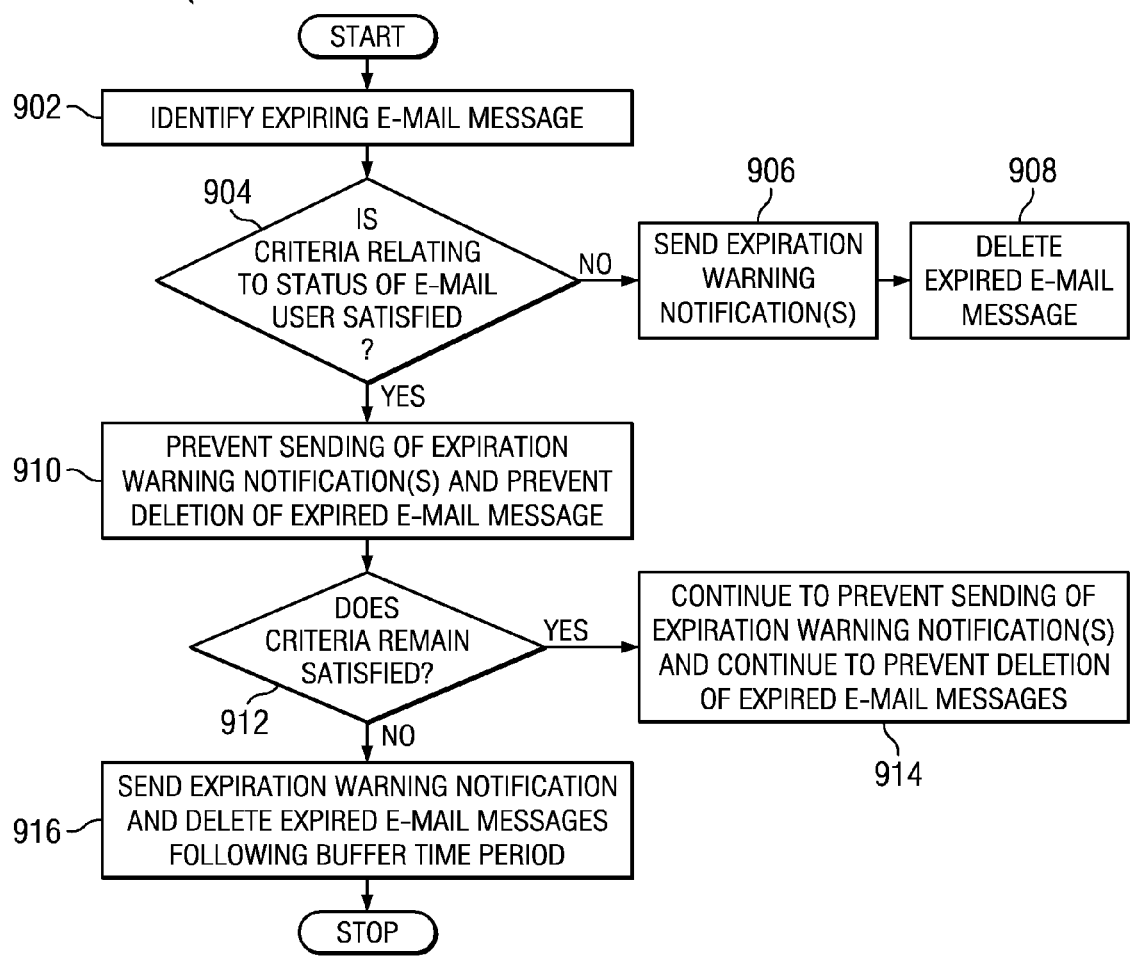
FIG. 9 is a flowchart that illustrates a method for preserving expired e-mail messages in accordance with an illustrative embodiment.

FIG. 9 is a flowchart that illustrates a method for preserving expired e-mail messages in accordance with an illustrative embodiment. The method is generally designated by reference number 900, and may be implemented by method 700 in FIG. 7. The method begins by identifying an e-mail message of a user that is approaching or has reached its expiration date (Step 902). The expiration date of the e-mail message may, for example, be sixty days or ninety days after it is received by the user. It is determined whether criteria relating to the status of the e-mail user is satisfied (Step 904). If it is determined that criteria relating to the status of the e-mail user is not satisfied (No output of Step 904), an expiration warning notification is sent to the user if the expiration date is approaching (Step 906), and the e-mail message is deleted if the expiration date has been reached (Step 908).

If it is determined that criteria relating to the status of the e-mail user is satisfied (Yes output of Step 904), the e-mail messaging system is prevented from sending an expiration warning notification or of deleting an expired e-mail message (Step 910). It is continued to be monitored whether the criteria relating to the status of the e-mail user is satisfied (Step 912). If the criteria remains satisfied (Yes output of Step 912), sending of e-mail expiration warning notifications or of deleting expired e-mail messages is continued to be prevented (Step 914). If it is determined that the criteria is no longer satisfied (No out put of Step 912), the e-mail messaging system is again permitted to send e-mail expiration warning notifications and to delete expired e-mail messages (Step 916). In accordance with an illustrative embodiment, the sending of expiration warning notifications and the deletion of expired e-mail messages may be delayed for a predetermined buffer time period, for example, one to three days, to provide the user with a reasonable time to review and act on the e-mails before they are deleted.

Illustrative embodiments thus provide a method for preserving e-mail messages. It is determined, by a processor, whether an event has occurred with respect to an e-mail message, wherein an occurrence of the event results in a consequence activity with respect to the e-mail message. Responsive to determining that the event has occurred, it is determined, by the processor, whether criteria is satisfied, wherein the criteria relates to a status of an e-mail user. Responsive to determining that the criteria is satisfied, the consequence activity is prevented notwithstanding that the event has occurred.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for preserving the functionality of an e-mail account containing e-mail messages for an e-mail user, comprising:

determining, by a processor, whether an event has occurred with respect to the email account, wherein an occurrence of the event results in a consequence activity with respect to the e-mail account, wherein the consequence activity will reduce the functionality of the email account;

responsive to determining that the event has occurred, determining, by the processor, whether criteria is satisfied, wherein the criteria relates to an absent status of the e-mail user; and responsive to determining that the criteria is satisfied and that the e-mail user is absent, preventing the consequence activity which reduces the functionality of the email account notwithstanding that the event has occurred.

2. The computer implemented method of claim 1, wherein the criteria comprises at least one of enablement of an away message and a calendar indication of the e-mail user being unavailable to access e-mails, and wherein determining that the e-mail user is absent comprises one of an absence of e-mail activity by the e-mail user and an absence of Internet access by the e-mail user.

3. The computer implemented method of claim 2, wherein the event comprises an e-mail mailbox storage threshold being reached, and the consequence activity comprises the mailbox being locked.

4. The computer implemented method of claim 2, wherein the event comprises reaching a date related to an expiration of an e-mail message, and the consequence activity comprises one of-sending an e-mail expiration warning to the user or deleting the e-mail message.

5. The computer implemented method of claim 1, further comprising:
reinstating the consequence activity responsive to the criteria no longer being satisfied.

6. The computer implemented method of claim 5, wherein reinstating the consequence activity comprises reinstating the consequence activity following a predetermined buffer time period after the criteria is no longer satisfied.

7. The computer implemented method of claim 6, wherein the buffer time period comprises from about one day to about three days.

8. A computer program product for preserving the functionality of an email account containing e-mail messages for an e-mail user, the computer program product comprising a computer-readable, tangible storage device and computer usable program code stored on the computer-readable, tangible storage device for:

determining, by a processor, whether an event has occurred with respect to the email account, wherein an occurrence of the event results in a consequence activity with respect to the e-mail account, wherein the consequence activity will reduce the functionality of the email account;

responsive to determining that the event has occurred, determining, by the processor, whether criteria is satisfied, wherein the criteria relates to an absent status of the e-mail user; and responsive to determining that the criteria is satisfied and that the e-mail user is absent, preventing the consequence activity which reduces the functionality of the email account notwithstanding that the event has occurred.

9. The computer program product of claim 8, wherein the criteria comprises at least one of enablement of an away message and a calendar indication of the e-mail user being unavailable to access e-mails, and wherein determining that the e-mail user is absent comprises one of an absence of e-mail activity by the e-mail user and an absence of Internet access by the e-mail user.

10. The computer program product of claim 9, wherein the event comprises an e-mail mailbox storage threshold being reached, and the consequence activity comprises the mailbox being locked.

11. The computer program product of claim 9, wherein the event comprises reaching a date related to an expiration of an e-mail message, and the consequence activity comprises one of sending an e-mail expiration warning to the user or deleting the e-mail message.

12. The computer program product of claim 8, further comprising computer usable program code stored on the computer-readable, tangible storage device for reinstating the consequence activity responsive to the criteria no longer being satisfied.

13. The computer program product of claim 12, wherein the computer usable program code stored on the computer-readable, tangible storage device for reinstating the consequence activity comprises computer usable program code stored on the computer-readable, tangible storage device for reinstating the consequence activity following a predetermined buffer time period after the criteria is no longer satisfied.

14. An apparatus, comprising:
a memory storing instructions, and
at least one processing unit for executing the instructions for preserving the functionality of an e-mail account containing e-mail messages for an e-mail user, the at least one processing unit executing the instructions to:
determine whether an event has occurred with respect to the email account, wherein an occurrence of the event results in a consequence activity with respect to the e-mail account, wherein the consequence activity will reduce the functionality of the email account;
responsive to determining that the event has occurred, determine whether criteria is satisfied, wherein the criteria relates to an absent status of the e-mail user; and
responsive to determining that the criteria is satisfied and that the e-mail user is absent, prevent the consequence activity which reduces the functionality of the email account notwithstanding that the event has occurred.

15. The apparatus of claim 14, wherein the criteria comprises at least one of enablement of an away message and a calendar indication of the e-mail user being unavailable to access e-mails, and wherein determining that the e-mail user is absent comprises one of an absence of e-mail activity by the e-mail user and an absence of Internet access by the e-mail user.

16. The apparatus of claim 15, wherein the event comprises an e-mail mailbox storage threshold being reached, and the consequence activity comprises the mailbox being locked.

17. The apparatus of claim 15, wherein the event comprises reaching a date related to an expiration of an e-mail message, and the consequence activity comprises one of sending an e-mail expiration warning to the user or deleting the e-mail message.

18. The apparatus of claim 14, wherein the at least one processing unit further executes the instructions to reinstate performing of the consequence activity responsive to the criteria no longer being satisfied.

19. The apparatus of claim 18, wherein the at least one processing unit further executing the instructions to reinstate the consequence activity comprises the at least one processing unit further executing the instructions to reinstate the consequence activity following a predetermined buffer time period after the criteria is no longer satisfied.

20. The apparatus of claim 19, wherein the buffer time period comprises from about one day to about three days.

21. The computer implemented method of claim 1, wherein the consequence activity comprises sending an e-mail expiration warning to the e-mail user.

22. The computer implemented method of claim 1, wherein the criteria comprises at least one of the absence of e-mail activity by the e-mail user and the absence of Internet access by the e-mail user.

23. The method of claim 3, wherein the e-mail mailbox storage threshold being reached comprises:
   determining, by the processor, whether the total size of all e-mail messages for the e-mail user in the e-mail account meets or exceeds a predetermined size for the e-mail account that can be stored in the e-mail mailbox storage.

24. The method of claim 23, further comprising:
   responsive to the determining, by the processor, that the total size of all e-mail messages for the e-mail user in the e-mail account meets or exceeds the predetermined size for the e-mail that can be stored for the e-mail account in the e-mail mailbox storage, adding by the processor temporary storage to the e-mail mailbox storage for temporarily storing the e-mail messages that would otherwise exceed the predetermined size.

\* \* \* \* \*